No. 714,871. Patented Dec. 2, 1902.
P. D. CULLUM.
COMBINED COOP AND NEST.
(Application filed Feb. 17, 1902.)
(No Model.) 2 Sheets—Sheet 1.
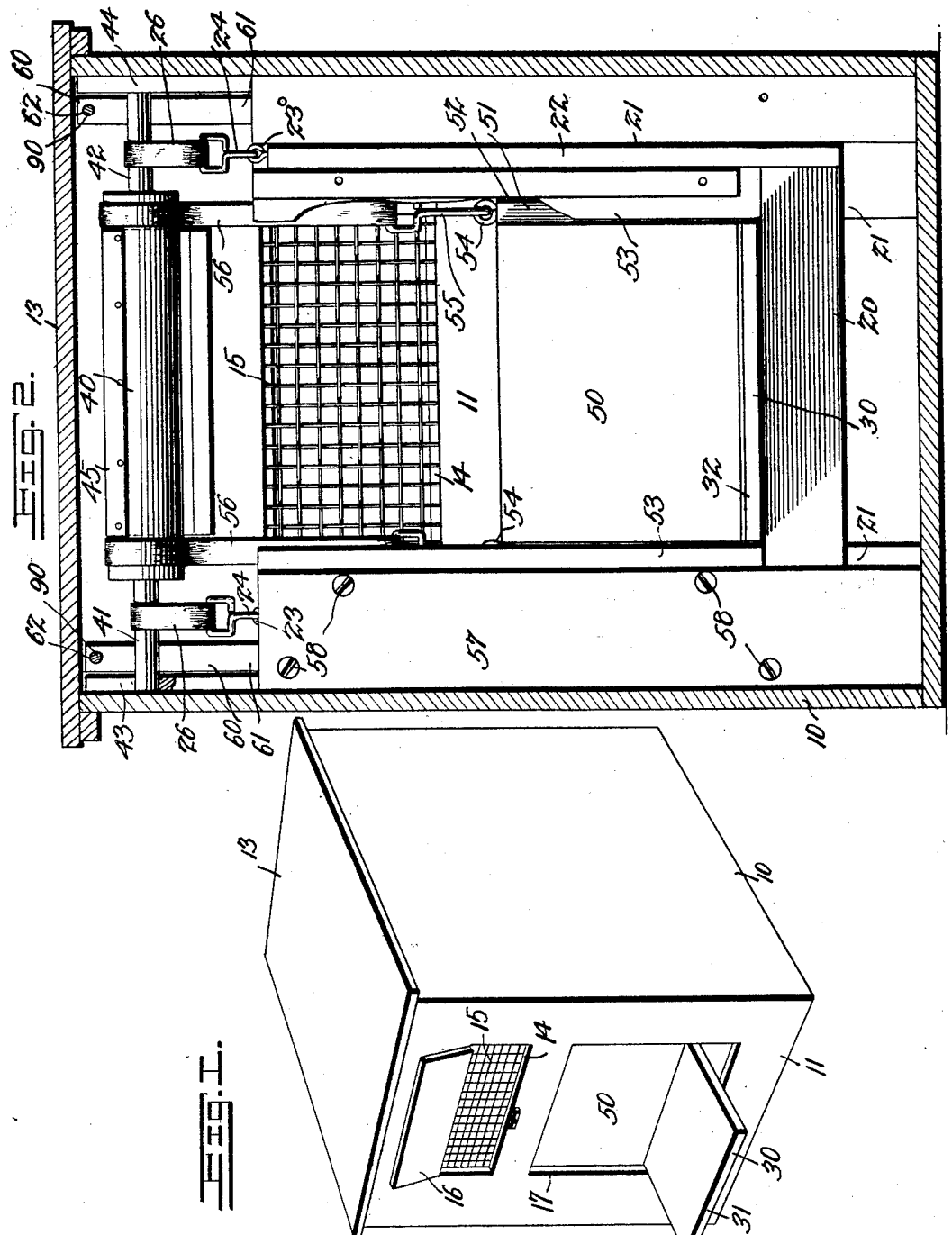

No. 714,871.  
P. D. CULLUM.  
COMBINED COOP AND NEST.  
(Application filed Feb. 17, 1902.)  
(No Model.)  
Patented Dec. 2, 1902.  
2 Sheets—Sheet 2.
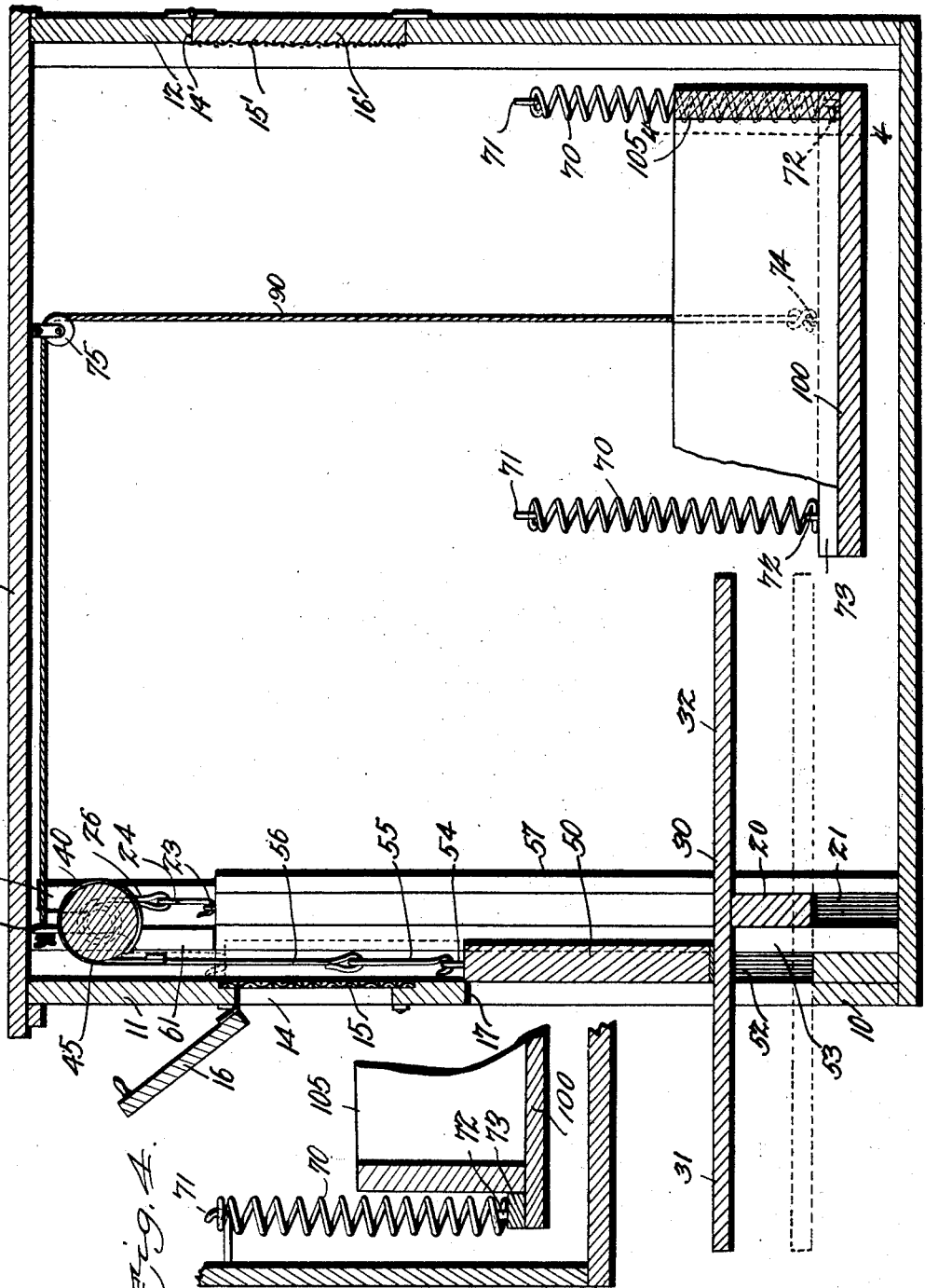

UNITED STATES PATENT OFFICE.

PERRY D. CULLUM, OF McKEES ROCKS, PENNSYLVANIA.

COMBINED COOP AND NEST.

SPECIFICATION forming part of Letters Patent No. 714,871, dated December 2, 1902.

Application filed February 17, 1902. Serial No. 94,505. (No model.)

*To all whom it may concern:*

Be it known that I, PERRY D. CULLUM, a citizen of the United States, residing at McKees Rocks, in the county of Allegheny and State of Pennsylvania, have invented a new and useful Combined Coop and Nest, of which the following is a specification.

This invention relates to a combined coop and nest adapted to be opened and closed by the hen or other fowl.

The object of the invention is to provide a combined coop and nest with suitable mechanism which when the nest is occupied will lock the coop against the entrance of another fowl and when the fowl leaves the nest will automatically open the door to permit her to pass out from the inclosed coop and close again after her exit, the opening, closing, and locking of the door being effected by the fowl.

Figure 1 of the accompanying drawings represents a perspective view of this improved coop and nest. Fig. 2 represents a transverse vertical section thereof, showing a rear elevation of the door and its actuating mechanism, the casing at the right being removed to show the mechanism disposed behind it. Fig. 3 represents a longitudinal vertical section thereof, the door over the front grating being shown in open position; and Fig. 4 is a section on line 4 4 thereof.

The same reference-numerals indicate corresponding parts in all the figures.

This improved coop and nest comprises a box-like casing or coop 10, having front and rear ends 11 and 12 and preferably provided with a removable cover 13 for affording access to the interior of the coop for cleaning and other purposes.

The front 11 of the coop 10 is provided with an opening 14 of any desired shape, which has a wire-netting 15 secured thereover and is provided with an outwardly-opening door 16, which, as shown, is hinged to the upper edge thereof. The rear end 12 has an opening 14', similar to the opening 14 in the front of the coop, which is covered with a wire-netting 15' and provided with an outwardly-opening door 16'. These gratings serve as peep-holes for the fowls and as ventilators for regulating the temperature in the coop. The front 11 is further provided with a large opening 17, extending to a point near the lower end thereof and closed by a suitable door, hereinafter to be described. This opening may be made in any desired shape. As shown, it is in the form of a rectangular oblong. A bar 20 extends transversely across the inner face of the front 11 and has its opposite ends projected beyond the edges of the opening 17 and adapted to slide vertically in guideways, as 21, formed at the inner face of the front 11. A platform 30 is attached at its center to said cross-bar 20 and has its end 31 projecting on the outside of the coop and its other end 32 extended into the coop. This platform is adapted for the hen to walk on in her entrance to and exit from the coop. The bar 20 is attached at its opposite ends to rods or bars, as 22, which slide in the guideways, as 21, on the opposite sides of the door-opening 17. The upper ends of these rods 22 are provided with loops or eyes, as 23, which are detachably engaged by hooks, as 24, attached to the lower ends of straps, as 26, which are fastened at their opposite ends to a roller, hereinafter to be described.

A roller 40 extends transversely across the top portion of the front end of the coop 10 and is preferably provided with reduced opposite ends 41 and 42, which are journaled in bearings formed in cleats 43 and 44, fastened to the sides of the box or coop 10, or, if desired, these ends may be journaled in the sides of the coop. The cleat 43 is slotted from the journal-bearing formed therein to the upper end thereof to provide means for removing the roller 40 from the coop when desired. A shade or curtain 45 is attached at its upper end to the roller 40 and extends down between the roller and the inner face of the front end 11 and normally hangs in front of the grating or peep-hole 14. When the roller is turned inward by weight or pressure exerted on the platform 30, conveyed to the roller through the medium of the cross-bar 20, rods 22, and straps 26, the curtain is rolled up on said roller out of the way, and when the roller is turned in the opposite direction it drops down over the opening 14 and shields the interior of the coop from view.

A sliding door 50, made slightly wider than the opening 17 in the front 11, is provided with flanges, as 51, formed on the opposite sides thereof and preferably formed by cutting away a portion of the door edges. These flanges extend into and slide freely in guideways, as 52, formed at the opposite sides of said opening 17 by fastening-cleats 53 to the front 11 on the inner face thereof at opposite sides of said opening 17. This door is preferably provided on its upper edge near the opposite sides thereof with eyes, as 54, which are detachably engaged by hooks, as 55, connected to the lower ends of straps, as 56. These straps 56 are fastened at their opposite ends to the opposite ends of the enlarged portion of the roller 40 and are adapted to be wound thereon in opposite direction to the straps 26.

Facings 57 are extended over the cleats and rods above described and fastened in place by screws, as 58, or in any other desired manner. These facings preferably terminate some little distance below the roller 40, preferably flush with the top of the opening 14.

Brakes 60 are disposed adjacent to the reduced ends 41 and 42 of the roller 40 and are preferably made into form of yielding strips composed of a tough wood, such as hickory or oak, or they may be made of metal, if desired. These strips, as shown, are made with thick base portions 61 and cut away from a point below the roller ends 41 and 42 to their upper ends, thereby rendering them more flexible at this point. The upper ends of these brakes 60 are preferably provided with apertures 62 for receiving cords or straps, hereinafter to be described.

A nest-platform is suspended in the coop, preferably near the rear thereof, by means of coiled springs 70, secured at their upper ends to the opposite walls of the coop by means of hooks or eyes 71 and connected at their lower ends with the platform 100 by means of eyes or hooks 72, which are secured to cleats 73. These cleats 73 are provided between their ends with centrally-arranged eyes 74, to which are connected the lower or rear ends of cords 90 or other flexible connections. The coiled springs, which are arranged in an upright position, are provided at their ends with suitable eyes or hooks for engaging the screw-eyes or hooks 71 and 72, and they permit the platform to be depressed for a purpose hereinafter described. The cords 90 extend upward from the depressible nest-platform 100 to guide-pulleys 75, and they extend forward therefrom to the upper ends of brakes 60. The nest is preferably composed of a frame 105, open at its top and bottom and removably disposed on the platform 100. Any suitable material may be placed in this frame to form the nest, such as straw, excelsior, or any other nest-forming substance.

In the operation of this improved nest, which is especially adapted for the use of hens, but may be used for any other fowl, a nest is made in the frame 105 and any desired number of eggs placed therein. If the device is to be used for a laying hen, only two or three eggs are placed in the nest to attract the hen thereto. The door 16 is then opened and the curtain 45 rolled up to afford insight into the coop, the door 50 being in its normally lowered position, closing the entrance to the coop.

Hens possess curiosity in a large degree, and when the inclosed nest is placed in the hen-house or any place the fowls frequent the first thing a hen will do is to investigate it. She first steps upon the end 31 of the platform 30, peers through the grated opening 14 over the door 50, thereby getting a view of the eggs in the nest. If the ventilator at the rear of the box be open and she gets her first sight of the eggs therethrough, she will continue her investigation until she finds a means of getting into the coop. When she steps upon the end 31 of the platform 30, her weight is sufficient to cause the platform to move down, which causes the rods 22 to slide downward on the guideways 21, thereby unwinding the straps 26 from the reduced ends 41 and 42 of the roller 40, which unwinding causes the roller to turn inwardly and wind the straps 56 up thereon, thereby causing the door 50 to slide up in the guideways 52 and uncover the opening 17 in the coop. When the door has moved up and the opening 17 is uncovered, the hen will walk therethrough to the end 32 of the coop platform which is disposed inside the coop, her weight keeping the door 50 in elevated position. The nest, with the eggs, being now in full view, she will naturally step into the nest either directly from the end 32 of the platform or by stepping first onto the floor and then into the nest. As soon as she steps off the platform the door 50 will descend of its own weight and close the opening 17. These various door-operating parts are so disposed and adjusted that the door will drop in proper position before the hen is quiet on her nest. It is preferable to make the coop long enough to cause the hen to step on the floor of the coop before going on the nest, so that the door 50 will drop before the brakes are tightened. When the hen gets into the suspended nest, her weight causes the springs 70 to be distended and the downward movement of the platform 100 pulls upon the cords 90 or other flexible connections, which carry the brakes 60 inward into engagement with the ends 41 and 42 of the roller, whereby the latter is prevented from rotating and opening the door should another chicken step upon the exterior portion of the depressible platform 30. Any other desired form of brake or locking device may be employed for locking the roller against movement when the nest is occupied. The hen is thus securely locked in the coop and is protected against intruders. When she desires to leave her nest and go out to feed or for any other purpose, she steps from the nest, which releases the brakes 60. Then she gets on the end 32 of the platform and her weight causes the door 50 to open and permits her to walk out through the opening 17 onto the end 31 of the platform. As soon as she steps onto the ground the door drops into closed position, the curtain unrolls over the grating 15, and the coop remains closed until weight or pressure is again exerted on the platform end 31. The curtain 45 may be used when needed and rolled up when not needed.

This protected hen-nest is especially useful for sitting hens, which protects them against the entrance of other hens which disturb and break their eggs and greatly interfere with the successful hatching of the eggs.

The box or coop 10 may be made of any desired size, with either a flat or a sloping roof and with the bottom made detachable, if desired.

When the chickens are hatched, the nest-platform may be removed by removing the top 13 of the coop and detaching the said platform from the supporting-springs, which may also be detached, if desired. If desired, the hen and her brood may roost in the coop until the chicks are of a size to go to the hen-house. The drop-door 50 can be raised to any desired height and held in this position by the use of a wedge inserted between the roller ends and the wall of the coop to hold the door partially open to allow the chicks free ingress and egress and at the same time to confine the hen within the coop.

When the hen becomes accustomed to her nest, no further attention need be paid to her except to feed her when she comes off.

When the chickens are housed in the coop, it may be found desirable to remove the platform 30, which may be accomplished by unhooking the eyes 23 from the hooks 24. The cross-bar 20, platform 30, and the rods 22 may then be removed from the coop and the door raised to any desired height and held there by placing a wedge between the wall of the coop and the roller or in any other desired manner.

I claim as my invention—

1. A box having an upright sliding door, a platform movable in the opposite direction from the door and extending beneath the same, and means connected with said platform for raising the door on the lowering of the platform, said door being normally closed and holding the platform in an elevated position.

2. A box having a sliding door, a movable platform connected therewith, said platform projecting into said box and extending on the outside thereof, and means connected with said platform for raising the door on the lowering of the platform, said platform adapted to be lowered from either the inside or the outside of the box.

3. A box having an opening therein, a sliding door for closing said opening, a platform connected with said door and mounted to slide vertically in said opening, and means connected with said platform for raising the door on the lowering of the platform and the reverse, said door being normally closed and holding the platform in an elevated position.

4. A nesting-box having an opening therein, a sliding door for closing said opening, a platform extending beneath the door and movable in the opposite direction, and intermediate mechanism connecting said platform with said door whereby the door is raised on the lowering of the platform, said door being normally closed and holding the platform in an elevated position.

5. A box having an opening therein, a sliding door for closing said opening, a roller mounted in said box above said door, straps connected at one end to said door and at their opposite ends to said roller, a platform extending through said opening, a slidably-mounted cross-bar connected to said platform, and straps connected at one end with said cross-bar and at their opposite ends to said roller, the straps connected with the door and those connected with platform being wound on said roller in opposite directions thereby causing the alternate raising and lowering of said door and platform.

6. A box having a sliding door, a platform extending beneath the door and movable in the opposite direction, a movable nest-holder, a locking device for holding the door and the platform against movement, and means for connecting the nest-holder with the locking device for carrying the latter to its engaging position when the nest is occupied, substantially as described.

7. The combination of a box having a door, mechanism for opening and closing said door, a brake connected with said mechanism and adapted to operate thereon, a nest-holder disposed in said box, and means for connecting said nest-holder with said brake by means of which the brake is applied on the occupation of the nest and released when the nest is vacated.

8. The combination of a box having a sliding door, a roller mounted in said box above said door, means connecting said door with said roller, a brake mounted in said box and adapted to bear on said roller, a movable nest, and means connecting said nest with said brake.

9. The combination of a box having a door, operating mechanism for said door, a brake mechanism connected with said door-operating mechanism, and a vertically-movable nest connected with said brake mechanism for operating it.

10. The combination of a box having a door, operating mechanism for the door, a brake mechanism connected with the door-operating mechanism, a vertically-movable nest-holder connected with the brake mechanism for operating it, and springs supporting the nest-holder and adapted to relieve the brake mechanism of the weight of the nest-holder when the nest is unoccupied, substantially as described.

11. The combination of a box having a door, a door-operating platform adapted to be depressed, means for connecting the platform with the door, whereby when the platform is depressed, the door will be opened, a spring-supported nest, and means connected with the nest for locking the door and the platform against movement when the nest is subjected to the weight of a hen, substantially as described.

12. The combination of a box having a vertically-movable door, a door-operating platform, a roller, flexible connections between the roller and the door and the platform, whereby the door will be opened when the platform is depressed, a brake or locking device arranged to engage the roller, and a spring-supported nest connected with the brake or locking device and adapted to cause the same to engage the roller when the nest is subjected to the weight of a hen, substantially as described.

13. The combination of a box, a door, a door-operating platform, a roller, flexible connections between the roller, the door and the platform, whereby the door will be opened when the platform is depressed, a brake or locking device, and a depressible nest suspended within the box and connected with the brake or locking device and adapted to cause the same to engage the roller, substantially as described.

In testimony that I claim the foregoing as my own I have hereto affixed my signature in the presence of two witnesses.

PERRY D. CULLUM.

Witnesses:
  WARD B. FAYE,
  HARRY PLUMMER.